(12) United States Patent
Clement et al.

(10) Patent No.: US 10,546,596 B2
(45) Date of Patent: Jan. 28, 2020

(54) METHOD OF MEASURING THE STATE OF VIGILANCE OF A PILOT

(71) Applicant: Airbus Operations (S.A.S.), Toulouse (FR)

(72) Inventors: Nicolas Clement, Toulouse (FR); Benoît Guaduin, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 16/279,025

(22) Filed: Feb. 19, 2019

(65) Prior Publication Data

US 2019/0267025 A1 Aug. 29, 2019

(30) Foreign Application Priority Data

Feb. 23, 2018 (FR) ..................................... 18 51572

(51) Int. Cl.
*G10L 25/51* (2013.01)
*B64D 45/00* (2006.01)
*H04R 29/00* (2006.01)

(52) U.S. Cl.
CPC .............. *G10L 25/51* (2013.01); *B64D 45/00* (2013.01); *H04R 29/004* (2013.01)

(58) Field of Classification Search
CPC ........ H04R 29/004; G10L 25/51; B64D 45/00
USPC .......................................................... 381/56
See application file for complete search history.

(56) References Cited

U.S. PATENT DOCUMENTS

| 5,339,259 A | 8/1994 | Puma et al. |
| 9,613,543 B2 * | 4/2017 | Whitlow .................. A61B 5/18 |
| 2015/0104038 A1 | 4/2015 | Kim |

FOREIGN PATENT DOCUMENTS

| EP | 2 434 465 A2 | 3/2012 |
| WO | WO 92/07346 A1 | 4/1992 |

OTHER PUBLICATIONS

French Search Report for Application No. 1851572 dated Nov. 19, 2018.

\* cited by examiner

*Primary Examiner* — Paul Kim
(74) *Attorney, Agent, or Firm* — Jenkins, Wilson, Taylor & Hunt, P.A.

(57) ABSTRACT

A method of measuring state of vigilance of a pilot by a measuring device to measure time between which a sound wave is emitted by a loudspeaker in the piloting station of an aircraft and is received by the microphone of a headset of a pilot and to calculate coordinates of a sphere centered on the loudspeaker and on the perimeter of which the microphone is situated. Calculation of points of intersection of spheres centered on different loudspeakers provides possible microphone positions in the space of the piloting station. These positions are those of the head of the pilot when the headset is used. Via the knowledge of at least one possible position of the head of the pilot in the piloting station, the measuring device can measure the state of vigilance of the pilot and to alert in case of a confirmed lack of vigilance of the pilot.

5 Claims, 4 Drawing Sheets

US 10,546,596 B2

METHOD OF MEASURING THE STATE OF VIGILANCE OF A PILOT

CROSS-REFERENCE TO RELATED APPLICATION

This application claims priority to French Patent Application 18 51572 filed on Feb. 23, 2018, the entire disclosure of which is incorporated by reference herein.

TECHNICAL FIELD

The disclosure herein relates to a method of measuring the state of vigilance of a pilot when piloting an aircraft.

BACKGROUND

The incapacity of a pilot when piloting an aircraft is manifested by an abnormal behaviour of the pilot for several seconds, in particular marked by a lack of vigilance of the pilot which may be due to physical or psychological illness (stress). As soon as a suspicion of incapacity when piloting exists, a plan of action is initiated to replace or assist the pilot so as to continue the flight of the aircraft under optimal conditions.

During a flight, the state of vigilance of a pilot is measured by another pilot, the ground control with which the pilot is in permanent radio contact, or else by sensors worn by the pilot (cardiac sensors for example). The wearing of such sensors for several hours of flight may inconvenience pilots.

SUMMARY

An objective of the disclosure herein is a way of measuring the state of vigilance of a pilot which is not inconvenient for the pilot. To this end, the disclosure herein relates to a method of measuring the state of vigilance of a pilot of an aircraft, the aircraft comprising a piloting station in which are arranged at least one screen and a man-machine interface, as well as least two loudspeakers, and at least one headset comprising a microphone designed to be used by a pilot and at least one earpiece, the microphone being situated in proximity to the head of the pilot when the latter uses his or her headset, the aircraft furthermore comprising an audio communication unit configured to manage the communications of the aircraft and to which are connected the loudspeakers and the headset, as well as a device for measuring the state of vigilance of a pilot of the aircraft, termed the measuring device, connected to the audio communication unit and configured to measure the time between which a sound wave is emitted by a loudspeaker and is received by the microphone and to calculate a plurality of possible positions of the microphone around the loudspeaker, wherein the method comprises the following steps:

a step E1 of emission in which the audio communication unit emits an electrical excitation signal to a loudspeaker;

a step E2 of conversion in which the loudspeaker converts the excitation signal into an acoustic wave;

a step E3 of reception in which the microphone captures the acoustic wave and converts it into an electrical signal transmitted to the audio communication unit;

a step E4 of calculation, in which the measuring device calculates the distance from the loudspeaker to the microphone and calculates the coordinates of a sphere centered on the loudspeaker and on the perimeter of which the microphone is situated;

the four steps E1-E4 being implemented for each loudspeaker each time an electrical excitation signal is emitted by the audio communication unit to the loudspeaker;

a step E5 of determining the position of the microphone implemented by the measuring device when the coordinates of at least two spheres centered on different loudspeakers have been calculated, in which the measuring device calculates the points of intersection of the spheres, the points of intersection being possible positions of the microphone and being representative of the possible positions of the head of the pilot when the latter uses his or her headset;

a step E6 of measuring the movement of the microphone, in which the measuring device measures, for a predetermined duration, the movements of at least one possible position of the microphone termed the detection position, determined in the preceding step E5;

a step E7 of determining lack of vigilance, in which the measuring device determines that the pilot exhibits a lack of vigilance if the microphone has not departed from the detection position by a predetermined distance for the predetermined duration;

a step E8 of alert, implemented in the case where the measuring device has determined that the pilot exhibits a lack of vigilance, in which the measuring device generates an electrical signal indicative of a lack of vigilance.

The method according to the disclosure herein is nonintrusive for the pilot and makes it possible to measure the state of vigilance of a pilot and to launch an alert in the case where the pilot lacks vigilance.

The disclosure herein also relates to an aircraft comprising a piloting station in which are arranged at least one screen and a man-machine interface, as well as at least two loudspeakers, and at least one headset comprising a microphone designed to be used by a pilot of the aircraft, the microphone being situated in proximity to the head of the pilot when the latter uses his or her headset, the aircraft furthermore comprising an audio communication unit, configured to manage the communications of the aircraft and to which are connected the loudspeakers and the headset, wherein the aircraft comprises a device for measuring the state of vigilance of the pilot termed the measuring device, connected to the audio communication unit and configured to:

measure the time between which a sound wave is emitted by at least a first and a second loudspeaker and is received by the microphone of a headset and to calculate the coordinates of a first sphere centered on the first loudspeaker and of a second sphere centered on the second loudspeaker;

calculate the points of intersection of the spheres, the points of intersection being possible positions of the microphone of the headset and being representative of the possible positions of the head of the pilot when the latter uses his or her headset;

measure the movements of at least one of the possible positions of the microphone.

BRIEF DESCRIPTION OF THE DRAWINGS

The abovementioned characteristics of the disclosure herein, as well as others, will become more clearly apparent on reading the following description of an exemplary embodiment, the description being given in conjunction with the appended drawings, among which.

DETAILED DESCRIPTION

Figure 1:
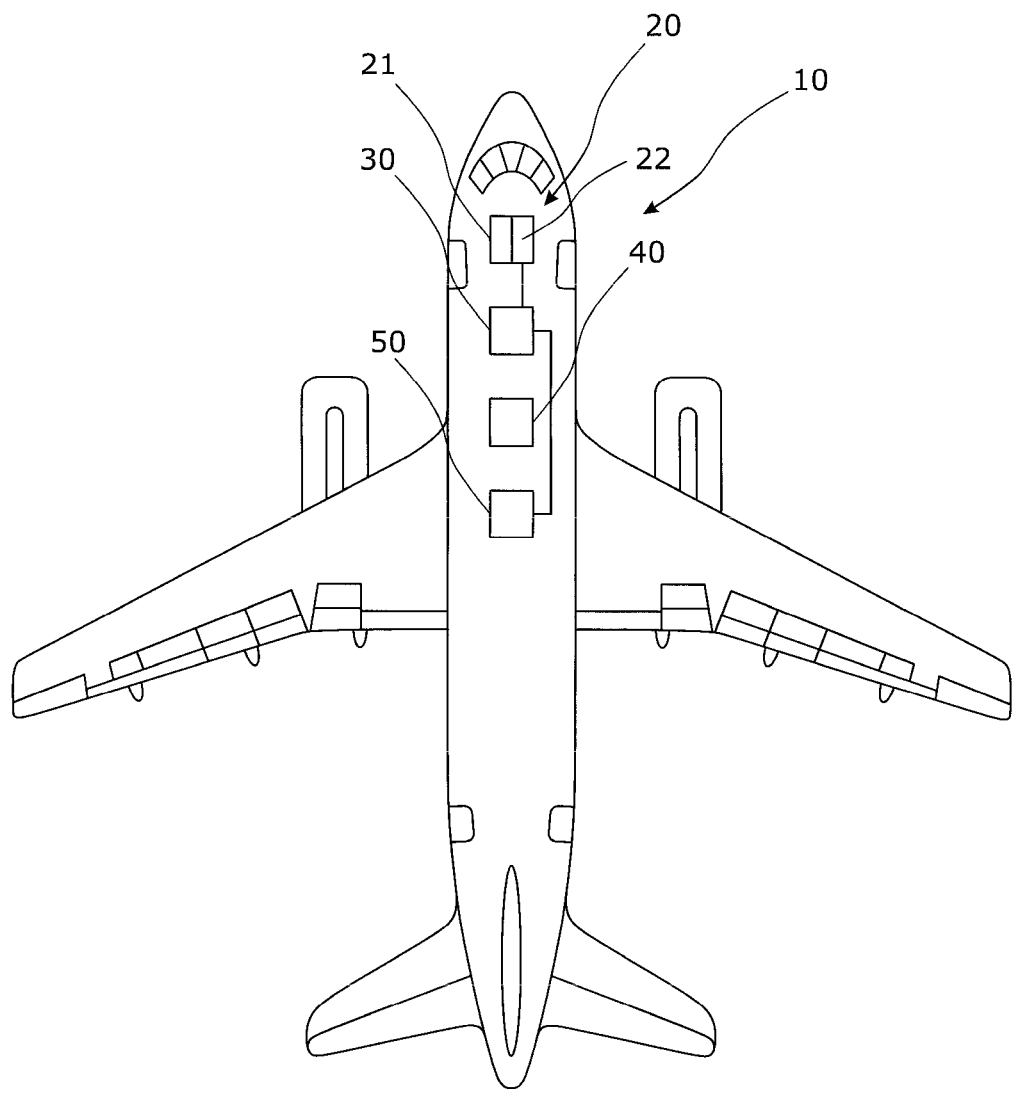
FIG. 1 represents an aircraft comprising a measuring device for implementing the method of measuring the state of vigilance of a pilot according to an embodiment of the disclosure herein.
Figure 2:
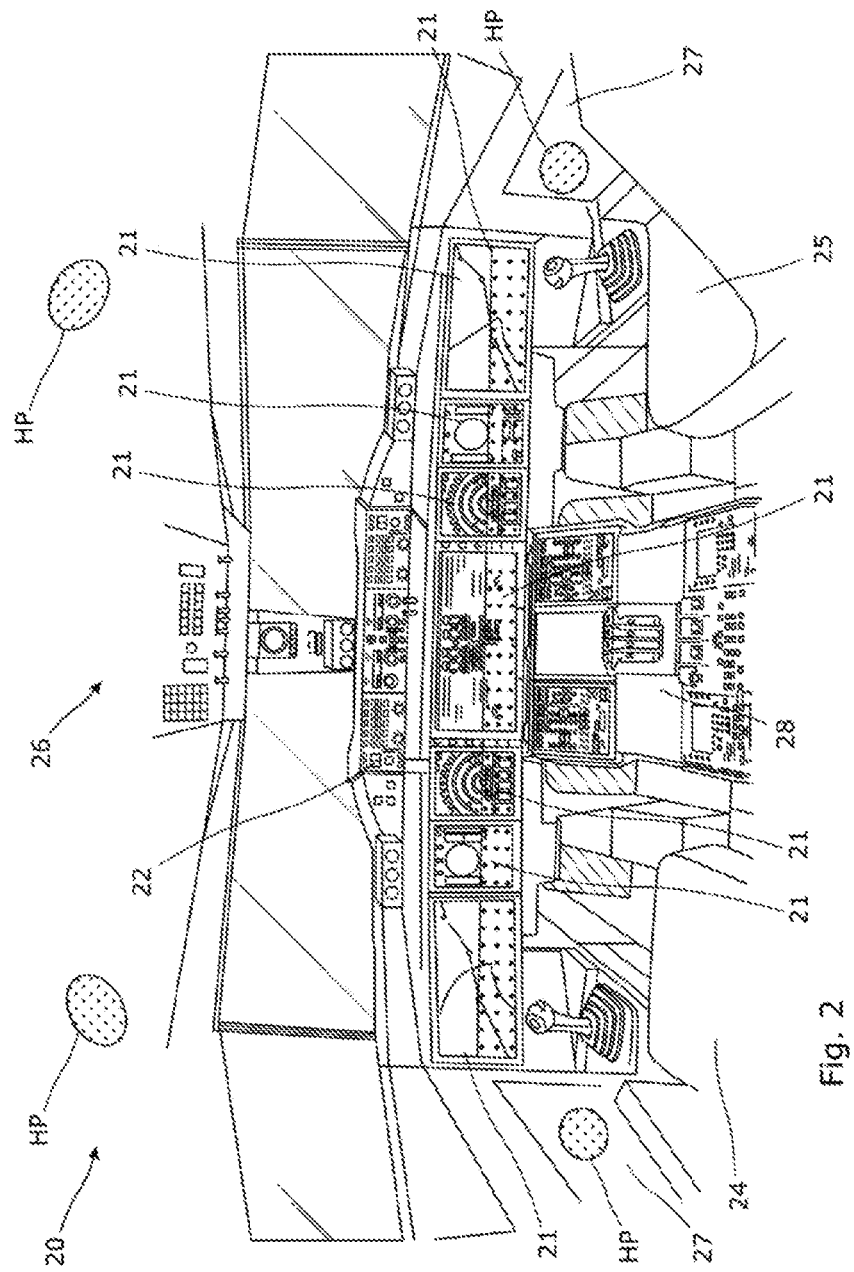
FIG. 2 represents a view of a piloting station of the aircraft of FIG. 1 in which are arranged various loudspeakers used in the implementation of the method of measuring the state of vigilance of a pilot according to an embodiment of the disclosure herein.

With reference to FIGS. 1 and 2, an aircraft 10 comprises a piloting station 20 in which are installed the seats of a first and of a second pilot (co-pilot) 24, 15, various screens 21 and a man-machine interface 22 (the screens comprise a man-machine interface when they are touchscreens) with which a pilot can interact to give instructions to the components of the aircraft.

The aircraft furthermore comprises communication device(s) which can comprise an audio communication unit 30 (Audio Management Unit) of central unit type the function of which is to manage the communications of the aircraft, and which is connected for this purpose to antennas (not represented) situated on the fuselage of the aircraft for receiving or emitting electrical signals, to an alert system 50 which emits electrical alert signals to at least one screen 21 in the case of the arising of an anomaly (example: stalling alarm, fire alarm, etc.), and to transducers for converting electrical signals into sound waves or vice versa.

The transducers are arranged in the piloting station 20 and comprise:
  at least two loudspeakers HP, for example arranged on the ceiling 26 or on consoles 27, 28 of the piloting station 20;
  for each pilot, a microphone M and two earpieces 31, 32 arranged on the headset C (boomset) of each pilot.

Figure 3:
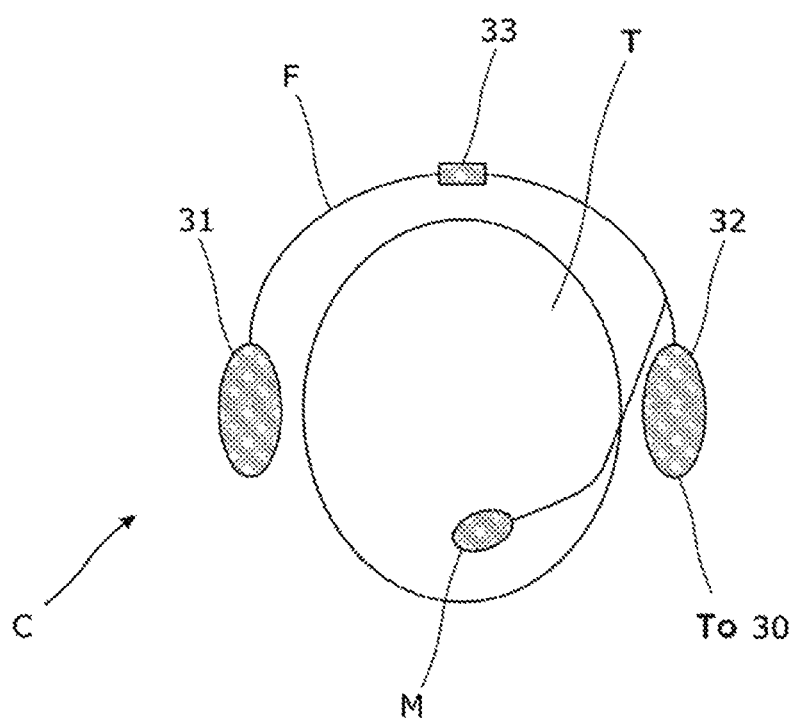
FIG. 3 is a view of a headset of a pilot used in the implementation of the method of measuring the state of vigilance of a pilot according to an embodiment of the disclosure herein.

In a known manner, and with reference to FIG. 3, a headset C comprises a headband F to each end of which is fixed an earpiece 31, 32. The microphone M is fixed to the headband F while being offset from the latter. In the usage position, the pilot adjusts the headset in such a way that the headband F envelopes the top of his or her head T, with an earpiece 31, 32 situated in front of each ear, the microphone M being itself situated in front of the pilot's mouth.

According to the disclosure herein, the aircraft 10 comprises a device for measuring the state of vigilance of a pilot of the aircraft 40, termed the measuring device, which is configured to measure the time between which a sound wave is emitted by the loudspeaker HP and is received by the microphone M of a headset and to calculate the coordinates of a sphere centered on the loudspeaker HP and on the perimeter of which the microphone M is situated.

The calculation of the points of intersection of at least two spheres centered on different loudspeakers HP provides possible positions of the microphone M in the space of the piloting station 20. These positions are those of the head of the pilot T when the headset C is used by the latter.

Via the knowledge of at least one possible position of the head T of the pilot in the piloting station 20, the measuring device 40 is configured to measure the state of vigilance of the pilot of the aircraft 10.

The measuring device 40 is either a module, integrated into the audio communication unit 30 or a module of central unit type, distinct from the audio communication unit 30 (as illustrated by FIG. 1), and connected to the latter as well as to the alert system 50.

Figure 4:
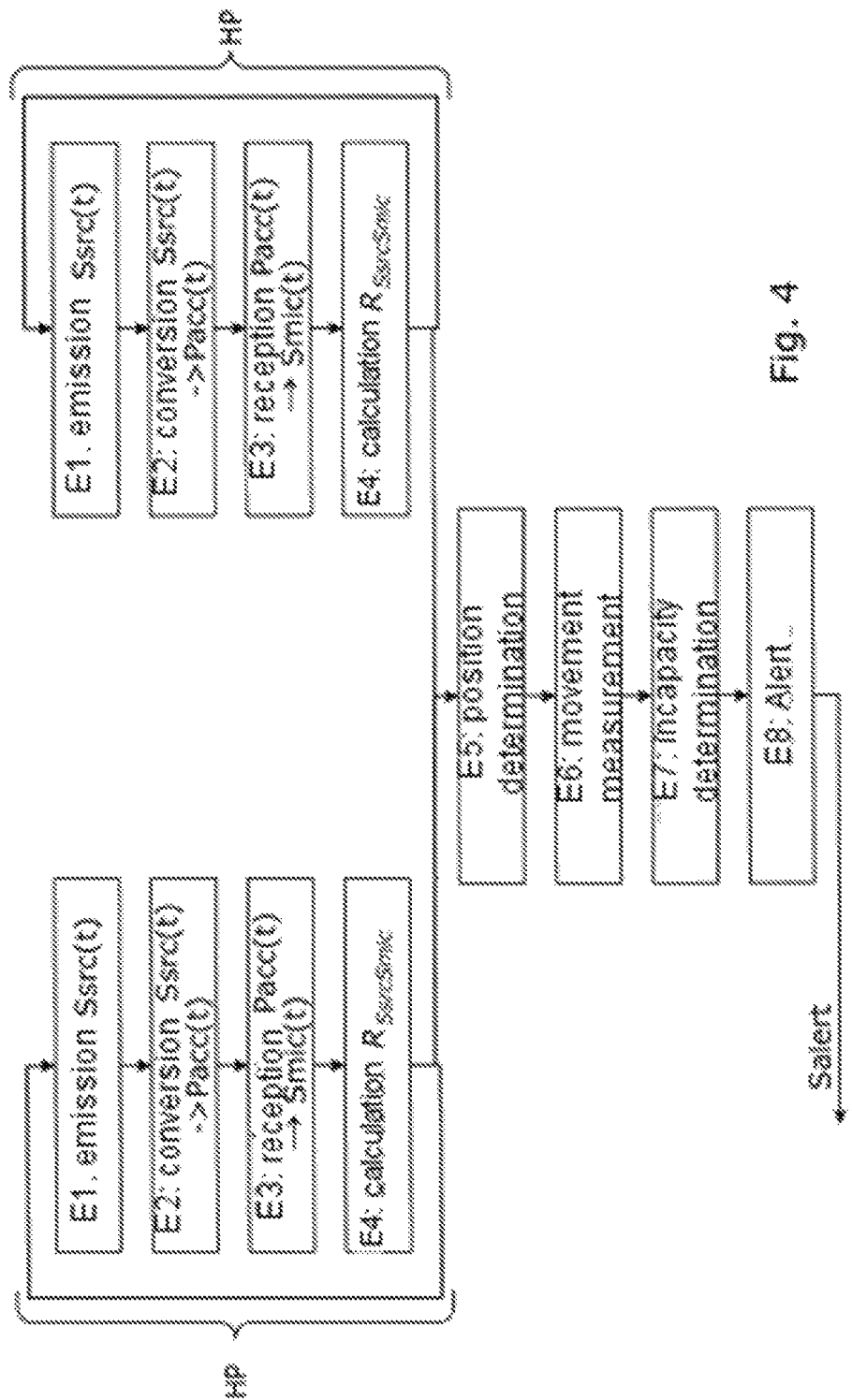
FIG. 4 is a chart representing the various steps of the method of measuring the state of vigilance of an aircraft according to an embodiment of the disclosure herein.

With reference to FIG. 4, the method for measuring the state of vigilance of a pilot implemented by the measuring device 40 will be explained in respect of its implementation in an aircraft piloting station 20 comprising two loudspeakers HP. A loudspeaker HP dedicated to the first pilot is arranged in proximity to the seat 24 of the latter, and symmetrically according to a median plane of the fuselage of the aircraft, another loudspeaker HP dedicated to the second pilot (co-pilot) is arranged in proximity to the seat 25 of the latter.

Consideration is given only to the case of the microphone M of the headset C of the first pilot, but the method as described applies in an identical manner for each microphone M of the pilot/co-pilot since the inputs of the microphones M are differentiated at the level of the audio communication unit 30 so that the unit can differentiate the signals that it receives from the microphones M.

In an emission step E1 the audio communication unit 30 emits an electrical excitation signal $S_{src}(t)$ to a loudspeaker HP. An electrical excitation signal emitted by the audio communication unit to a loudspeaker is for example:
  a signal received from outside the aircraft (another aircraft, ground, etc.) via an antenna;
  an electrical alert signal generated by the alert system 50. The electrical alert signal is, for example, a signal, which when it is converted into an acoustic wave, will be a beep, a tone, an alarm; and
  a signal specific to the measurement of the state of vigilance of a pilot which is generated by the measuring device 40. The specific signal is, for example, configured to be inaudible to the pilots once converted into an acoustic wave.

In a conversion step E2, the loudspeaker HP converts the excitation signal $S_{src}(t)$ into an acoustic wave $P_{acc}(t)$, then in a step E3 of reception, the microphone M of the headset C of a pilot captures the acoustic wave $P_{acc}(t)$, and converts it into an electrical signal $S_{mic}(t)$ which is transmitted to the audio communication unit 30.

On completion of step E3, in a calculation step E4, the measuring device 40 calculates the distance from the loudspeaker HP to the microphone M of the headset of the pilot and calculates the coordinates of a sphere around the loudspeaker HP on the perimeter of which the microphone is situated.

In detail, the calculation of the distance and of the coordinates of the sphere comprises:

a) calculation of the maximum of the intercorrelation function $R_{S_{src}S_{mic}}$ between the electrical excitation signal $S_{src}(t)$ and the electrical signal $S_{mic}(t)$ emitted by a microphone that has received the acoustic wave $P_{acc}(t)$ of the loudspeaker HP, the maximum thus calculated represents the acoustic propagation time of the excitation signal $S_{srcl}(t)$.

b) the calculation of the distance from the loudspeaker HP to the microphone M, by multiplying the propagation time calculated by the speed of sound; and c) the determination of the coordinates of the sphere, made possible by the fact that loudspeaker HP has a fixed and known position in the piloting station 20 (the position is recorded in a memory of the measuring device 40).

The four steps E1-E4 are implemented for the other loudspeaker HP. In a general manner, the four steps E1-E4 are implemented for a loudspeaker each time an electrical excitation signal Ssrc(t) is emitted by the audio communication unit 30 to the loudspeaker HP.

As a function of the nature of the electrical excitation signals Ssrc(t), the four steps E1-E4 are implemented simultaneously on each of the loudspeakers HP (case in the case of an alert or of a radio signal), or may be implemented in a staggered manner when the electrical excitation signals Ssrc(t) are signals specific to the measurement of the state of vigilance.

In a step E5 of determining the position of microphone M, implemented when the coordinates of two spheres centered on two different loudspeakers HP have been calculated (that is to say each time a cycle of steps E1 to E4 is carried out for a first and second loudspeaker HP), the measuring device 40 calculates the points of intersection of the spheres situated around the two loudspeakers HP. These points of intersection are possible positions of the microphone M in the space of the piloting station.

In a step E6 of measuring the movement of the microphone, the measuring device 40 measures, for a predetermined duration (for example, of the order of 30s), the movements of the microphone M while taking as reference one of the possible positions, termed the detection position, of the microphone M, determined in the preceding step E5. It will be noted that the increasing of the frequency of emission of electrical excitation signals for each loudspeaker increases the precision of the measurement of the movement of the microphone.

Thereafter, in a step E7 of determining incapacity, the measuring device 40 determines that the pilot exhibits a lack of vigilance if the microphone M has not departed from the detection position by a predetermined distance (of the order of a few centimeters, 2 cm for example) for a predetermined duration.

If during the predetermined duration, the head of the pilot has departed from the detection position by the predetermined distance, then the measuring device 40 resumes the measuring of the state of vigilance in step E5.

Conversely, if during the predetermined duration, the head of the pilot has not departed from the detection position by the predetermined distance, then the measuring device 40, in an alert step E8, generates an electrical signal Salert indicative of a lack of vigilance of the pilot.

This signal Salert is transmitted to the audio communication unit 30 for the dispatching of a signal to the earpieces of the headset C of the pilot for which the measuring device 40 has measured a state of lack of vigilance. The signal is in this case designed to be transformed into an alarm sound which is audible by the earpieces 31, 32 of the headset C of the pilot and the alarm is emitted as long as the pilot does not accomplish a predefined action, such as for example a head movement, a specific interaction with the man-machine interface 22, etc.

As a variant, the signal Salert is transmitted to the alert system 50 for the displaying of a message on at least one of the screens 21 of the piloting station 20. The message is conspicuous (for example flashing, of a vivid colour etc.) and comprises an instruction requesting the pilot/co-pilot to accomplish an action (interaction requested of the pilot with the man-machine interface 22) within a predetermined time span (for example 30 seconds) so as to ensure that at least one pilot is capable of piloting. If the pilot or the co-pilot accomplishes the action requested within the time span, the measuring device 40 resumes measuring the state of vigilance. On the other hand if no pilot accomplishes the action, a signal is dispatched by the measuring device 40 to an assistance on the ground for the implementation of assistance measures, such as for example the taking of remote control of the aircraft.

The disclosure herein is particularly suited to a configuration of piloting station 20 which comprises more than two loudspeakers HP. If the piloting station comprises a number n of loudspeakers HP, steps E1 to E4 may be performed for each of the n loudspeakers. Since the number of points of intersection of n spheres decreases as the number of loudspeakers gets bigger, the precision of the determination of the position of the microphone M is all the bigger the higher the number of loudspeakers HP. Thus, when the piloting station 20 comprises at least 4 loudspeakers, the intersection of each of the four spheres is a single point.

In the above-described description of the method, it was considered that the pilot wears his or her headset C throughout the flight, for example because the pilot is obliged to do so by the airline. As a variant, the measuring device 40 is configured to take account of the fact that for long flight durations, the pilot may have to remove his or her headset C.

To this end, in an embodiment of the disclosure herein, the headset C of the pilot comprises a proximity sensor 33 mounted on the headband F of the headset and whose zone of detection is oriented towards the concave part of the headset. The sensor 33 generates a signal Sactiv comprising the information according to which the headset C is worn by the pilot when the head T of the pilot is situated in proximity to the sensor 33 (for example, less than two centimeters). By considering an example in Boolean logic where the signal Sactiv set to 1 indicates that the headset C is worn by the pilot, the measuring device 40 receiving the output of the sensor is capable of generating an electrical signal Salert only when the signal Sactiv is set to 1.

The description of the method as described above is then modified in the sense:
that it comprises a step EP of verifying the usage of the headset C by the pilot, implemented permanently by the measuring device 40, in which the measuring device 40 verifies that the headset is worn by the pilot (receipt of a signal Sactiv set to 1 in Boolean logic considered here by way of example only), or is not worn by the pilot (receipt of a signal Sactiv set to 0).
that the alert step E5 is implemented on the further condition that the headset C is worn by the pilot (i.e. Sactiv set to 1).

In a preferred embodiment of the disclosure herein, when the electrical excitation signals Ssrc(t) are signals specific to the measurement of the state of vigilance of a pilot, the audio communication unit 30 generates a distinct electrical excitation signal for each loudspeaker HP and these signals are dispatched to the various loudspeakers HP in staggered mode. It is thus possible to differentiate each signal emitted by a loudspeaker. According to this embodiment, the movement of the microphone is measured continuously and the measurement of the state of vigilance is more precise.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the term "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method of measuring a state of vigilance of a pilot of an aircraft, the aircraft comprising a piloting station that comprises at least one screen and a man-machine interface, as well as least two loudspeakers, and at least one headset comprising a microphone for use by the pilot and at least one earpiece, the microphone being situated in proximity to a head of the pilot when the pilot uses his or her headset, the aircraft further comprising an audio communication unit configured to manage communications of the aircraft and to which the loudspeakers and the headset are connected, as well as a measuring device for measuring the state of vigilance of the pilot of the aircraft, the measuring device connected to the audio communication unit and configured to measure time between which a sound wave is emitted by a loudspeaker and is received by the microphone and to calculate a plurality of possible positions of the microphone around the loudspeaker, the method comprising:

an emission step E1 in which the audio communication unit emits an electrical excitation signal to a loudspeaker;

a conversion step E2 in which the loudspeaker converts the electrical excitation signal into an acoustic wave;

a reception step E3 in which the microphone captures the acoustic wave and converts the acoustic wave into an electrical signal transmitted to the audio communication unit;

a calculation step E4 in which the measuring device calculates a distance from the loudspeaker to the microphone and calculates coordinates of a sphere centered on the loudspeaker and on a perimeter of which the microphone is situated;

wherein steps E1-E4 are implemented for each loudspeaker each time an electrical excitation signal is emitted by the audio communication unit to the loudspeaker;

a step E5 of determining position of the microphone implemented by the measuring device when the coordinates of at least two spheres centered on different loudspeakers have been calculated, in which the measuring device calculates points of intersection of the spheres, the points of intersection being possible positions of the microphone and being representative of possible positions of the head of the pilot when the pilot uses the headset;

a measuring step E6 of measuring movement of the microphone, in which the measuring device measures, for a predetermined duration, movements of at least one possible detection position of the microphone determined in preceding step E5;

a step E7 of determining lack of vigilance, in which the measuring device determines that the pilot exhibits a lack of vigilance if the microphone has not departed from the detection position by a predetermined distance for the predetermined duration; and a step E8 of alert, implemented when the measuring device has determined that the pilot exhibits a lack of vigilance, in which the measuring device generates an electrical signal indicative of a lack of vigilance, wherein in step E4 of calculation implemented for a loudspeaker, the measuring device;

calculates a maximum of an intercorrelation function between the electrical excitation signal of the audio communication unit and the electrical signal originating from the microphone, the maximum thus calculated representing an acoustic propagation time of the electrical excitation signal;

calculates the distance from the loudspeaker to the microphone; and determines the coordinates of the sphere around the loudspeaker.

2. The method of a detection according to claim 1, wherein following the alert step E8, the electrical signal indicative of a lack of vigilance of the pilot is transmitted to the audio communication unit, and wherein on receipt of the electrical signal, the audio communication unit emits an electrical excitation signal to at least one earpiece of the headset for emission of an alarm sound audible by the pilot.

3. The method of detection according to claim 1, wherein the aircraft comprises an alert system configured, in case of an anomaly, to emit electrical alert signals and display alert messages on the at least one screen, wherein following the alert step E8, the electrical signal indicative of a lack of vigilance of the pilot is transmitted to the alert system for displaying, on the at least one screen, a message requesting the pilot to perform an action via the man-machine interface within a predetermined time span; and if a pilot accomplishes the action within the predetermined time span, the measuring device loops back to the step E5 of determining the position of the microphone;

if a pilot does not accomplish the action within the time span, a signal is dispatched by the measuring device to an assistance on ground for implementation of assistance measures.

4. The method of detection according to claim 1, the headset comprising a headband intended to clasp the head of the pilot when the headset is used, and a proximity sensor mounted on the headband, a zone of detection of the sensor being oriented towards a concave part of the headband, the sensor being configured to generate a signal comprising information according to which the headset is used when the head of the pilot is situated within a predetermined distance from the sensor, and wherein the method comprises a step EP of verifying use of the headset by the pilot, implemented permanently by the measuring device, in which the measuring device determines whether the headset is used or not by the pilot as a function of the information contained in the signal generated by the sensor, and wherein the alert step E8 is implemented on a further condition that the headset is used by the pilot.

5. The method of detection according to claim 1, the aircraft comprising an alert system configured, in case of an anomaly, to emit electrical alert signals and to display alert messages on the at least one screen, wherein an electrical excitation signal emitted by the audio communication unit towards a loudspeaker is a signal taken from among:

a signal received from outside the aircraft;
an electrical alert signal generated by the alert system;
a signal specific to detection of incapacity of a pilot, generated by the measuring device.

* * * * *

UNITED STATES PATENT AND TRADEMARK OFFICE
CERTIFICATE OF CORRECTION

PATENT NO. : 10,546,596 B2
APPLICATION NO. : 16/279025
DATED : January 28, 2020
INVENTOR(S) : Nicolas Clement and Benoit Gauduin It is certified that error appears in the above-identified patent and that said Letters Patent is hereby corrected as shown below:

On the Title Page

The name of item (72) the second inventor is corrected to read Benoit Gauduin.

Signed and Sealed this
Twenty-fourth Day of September, 2024

Katherine Kelly Vidal
*Director of the United States Patent and Trademark Office*